United States Patent [19]
Batchelder et al.
[11] 4,394,102
[45] Jul. 19, 1983

[54] SERVO AMPLIFICATION SYSTEM

[75] Inventors: Clarence F. Batchelder, Jamul; Charles E. Thomas, San Diego; Kent B. Casady, La Jolla, all of Calif.
[73] Assignee: Clipp Control Corporation, San Diego, Calif.

[21] Appl. No.: 327,386
[22] Filed: Dec. 4, 1981
[51] Int. Cl.[3] ..... B25J 3/00
[52] U.S. Cl. ..... 414/5; 414/694; 414/699
[58] Field of Search ..... 414/4, 5, 694, 699; 91/460

[56] References Cited

U.S. PATENT DOCUMENTS 4,059,196 11/1977 Uchino et al. ..... 414/699

FOREIGN PATENT DOCUMENTS 847656 9/1960 United Kingdom ..... 414/4
1070056 5/1967 United Kingdom ..... 414/4

*Primary Examiner*—Douglas C. Butler
*Assistant Examiner*—Donald W. Underwood
*Attorney, Agent, or Firm*—Henri J. A. Charmasson

[57] ABSTRACT

A servo amplification system is created particularly for heavy construction equipment, but has a general utility that is much broader. The system utilizes a hydraulic analog system with a separate subsystem for each dimension of motion. The operator moves the operative element, such as the backhoe bucket, of the analog replica which ordinarily would be situated in the cab of the backhoe or other piece of equipment. A small hydraulic cylinder operative in response to movement at each articulated connection of the backhoe operates a pilot valve which controls a pilot piston mechanically linked to the drive valve of the drive cylinder of the corresponding articulation in the actual backhoe. A feedback system comprising a mechanical link from the actual drive piston to a feedback cylinder and piston delivers hydraulic fluid back to the inlets of the pilot valve in such a way as to cancel the pilot orders from the initial control cylinder. The resulting action is virtually perfect analog simulation by the actual backhoe of the movements of the replica backhoe.

13 Claims, 28 Drawing Figures

SERVO AMPLIFICATION SYSTEM

BACKGROUND OF THE INVENTION

Modern construction equipment is generally hydraulically operated. The controls used by the operator constitute hydraulic valves which directly connect to the hydraulic cylinders at the articulations, or other sites of relative motion between the structural members which mount the operative element of the equipment. It is common to have three, four, and more hydraulic drive cylinders which operate the equipment, requiring the corresponding number of hand operated valves.

A skilled operator of a backhoe or other piece of equipment can operate it as though it were an extension of his own body utilizing the hydraulic valves. However, it may take a couple of years before an operator achieves this level of skill, and in the meantime an extremely expensive piece of equipment is being underutilized during the training process.

Additionally, during the learning period, when the operator does not accurately move and stop the machine as he should, it is difficult on the equipment and puts a strain on most of the operating parts. This is especially evident in rental units. A backhoe in a rental year will require quite frequent major maintenance.

Many of these training problems are a result of the hydraulic control system available to the operator. Like playing a musical instrument, it takes a time before the operator can freely move all of the controls concurrently in a smooth, synchronized fashion which maximizes the productivity of the machine and minimizes structural damage. A system which could integrate all of this motion into a single analog control device, in which the operator merely moves the operative element such as a backhoe on a miniature scale, causing the comparable movement of the actual backhoe, would unquestionably speed the operator learning process, save equipment, and enable nonprofessionals such as those renting units from a rental yard to utilize equipment more effectively.

SUMMARY OF THE INVENTION

The present invention fulfills the above stated need by replicating in miniature the operative parts which support the operative element of the equipment. Although the system is applicable to a wide range of construction equipment, earth moving machines and virtually anything where an operator controls a machine, and thus the system described and claimed herein is intended to cover all applications, the description from this point on will pertain to a backhoe to eliminate the need for repetitive, broadening verbiage. It is clear the principles and systemic elements of the backhoe device can be generalized to any hydraulically operated machine having any number of dimensions of motion.

The replica backhoe contains internal hydraulic lines to avoid the need for loose external lines which would be subject to breakage.

Each articulation in the operative portion of the backhoe arm is provided with a control cylinder which is operated by motion about the articulation and transmits information concerning the motion by way of hydraulic lines to a pilot valve. The pilot valve, which in itself is a novel element created by the inventor for this particular purpose, operates a pilot piston which is incorporated in the same unit which mechanically controls the valve for the drive cylinder for the respective articulation on the actual boom structure.

Each of the analog drive mechanisms for each articulation described above also has associated with it a feedback system comprising a cylinder mounted on or adjacent the drive cylinder of the respective articulation and mechanically driven by motion at the articulation to deliver hydraulic fluid to the pilot inlets of the respective pilot valves. The feedback system delivers pilot fluid at what amounts to 180° out of phase with the control system so that, for example, rotation of the replica shovel causes rotation of the actual shovel which is immediately cancelled by the negative feedback from the feedback system, as soon as the replica control valve stops moving. In this fashion, a direct analog movement occurs virtually simultaneously in the actual operative members of the backhoe with the replica backhoe.

DETAILED DESCRIPTION OF THE PREFERRED EMBODIMENT

Figure 1:
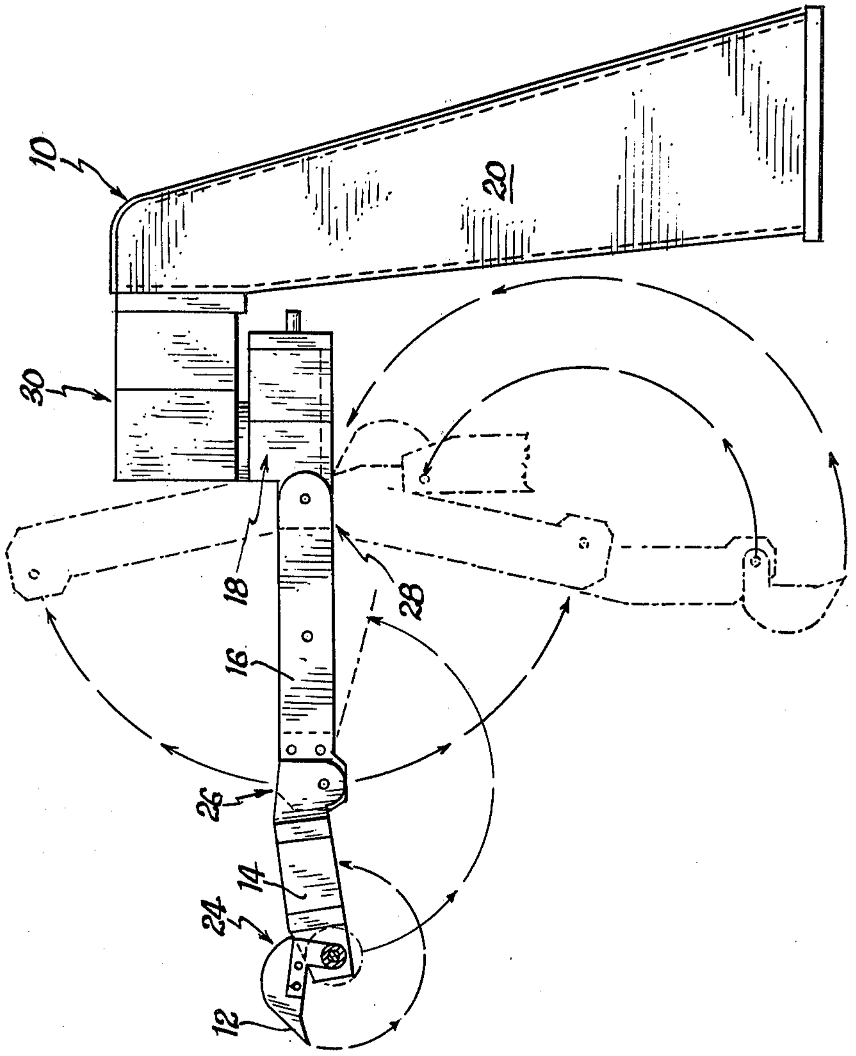
FIG. 1 is a somewhat diagrammatic illustration of the replica backhoe.
Figure 2:
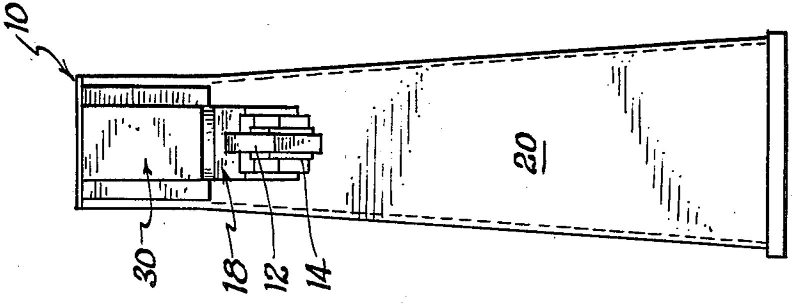
FIG. 2 is a front elevation view of the replica.
Figure 3:
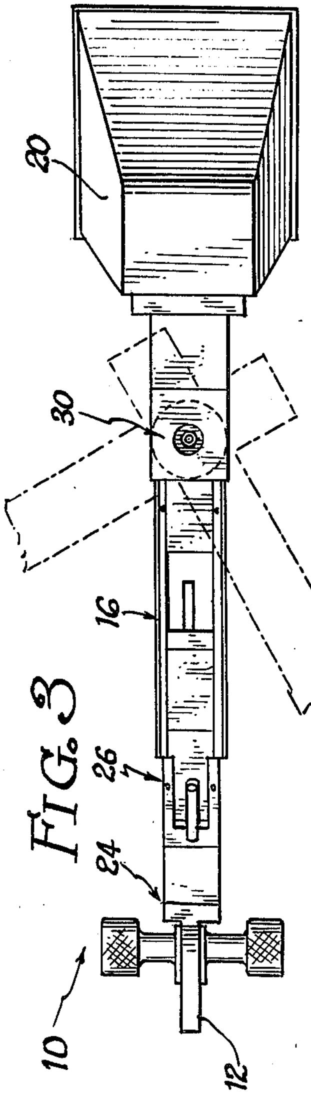
FIG. 3 is a top elevation view of the replica showing the hand knobs in place.

The replica backhoe arm is shown at 10 in FIG. 1. The arm consists of a replica shovel 12, a dipper stick 14, a boom 16 mounted to a swivel 18 which is articulated about a vertical axis on a base member generally indicated at 20.

The replica 10 is mounted in its entirety in the cab of the backhoe and ordinarily positioned such that the operator straddles the base 20 in operation, and has a full view of the actual backhoe. The actual backhoe arm is not shown in the drawings, as it is not needed in order to clearly understand the operation of the system.

Figure 4:
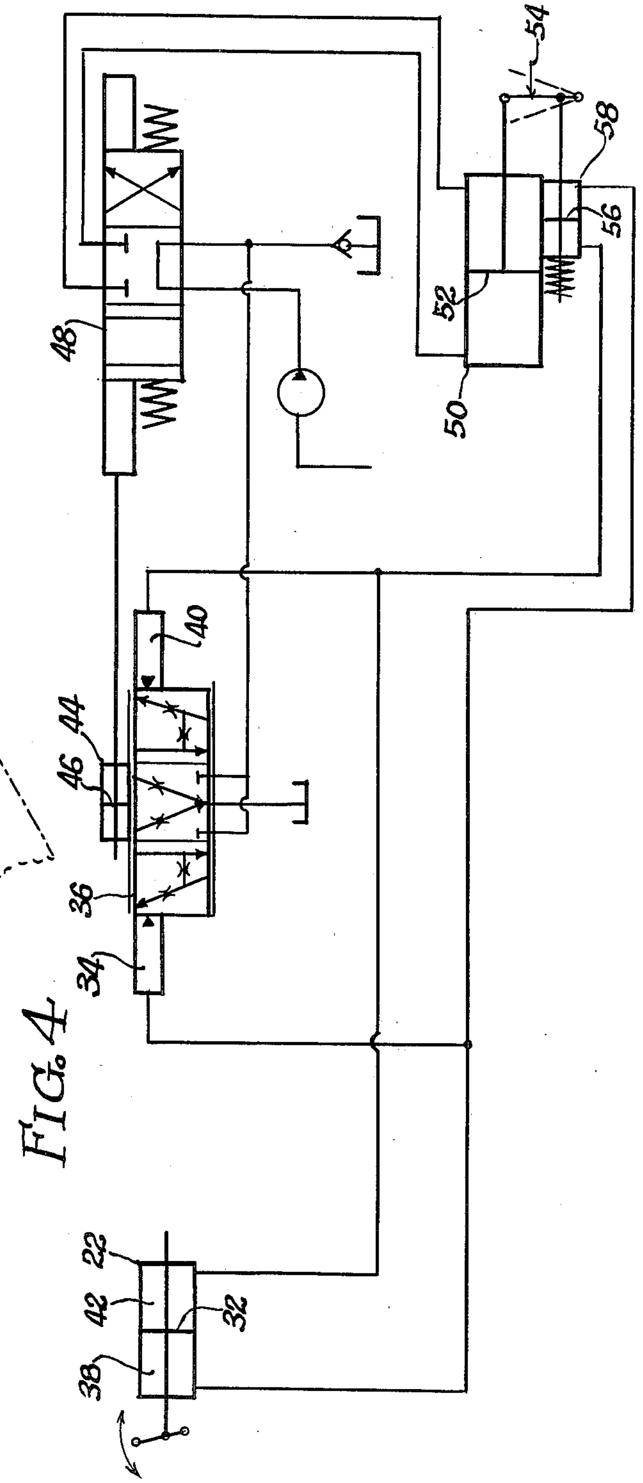
FIG. 4 is a schematic illustrating the hydraulics of the system.

Before turning to the mechanical details of the device, the operation of the hydraulic system will be explained. This system is fully set forth in FIG. 4. Actually, it is more accurate to say FIG. 4 represents one subsystem, there being four identical subsystems in the backhoe implementation which together define the complete system.

Between each of the parts of the backhoe arm which define relative movement a dimension of movement is defined. For example, the bucket 12 sweeps a circle about its axis to define an angular progression about a horizontal axis as its dimension of motion. This is a single dimension of motion in that it may be defined by a single, non-vectorial coordinate. Thus, each of the articulations 24, 26, 28 and 30 defines a separate dimension of movement in which any and all positions may be exactly located with a single number. It will become apparent from the description of the hydraulic system that each dimension of motion is separately treated by its own hydraulic subsystem and, acting independently of the other dimensions, causes the analog movement to occur on an amplified scale in the actual articulation of the real backhoe arm.

Returning to FIG. 4, the control cylinder 22 is a generalized control cylinder, as are all the outer elements in FIG. 4, which are, in fact, found four times in the actual physical implementation. For simplicity, FIG. 4 will be described as though the control cylinder 22 was connected to and represented the articulation 24 between the dipper stick and the bucket 12.

Assuming that the simulated bucket is dipped and this causes the control piston 32 of the cylinder 22 to move to the left, this in turn causes a pressure in the pilot inlet 34 of the pilot valve 36 from the control chamber 38 and simultaneously permits drainage from the pilot inlet 40 back into the second pilot chamber 42. Action of the pilot inlets 34 and 40, of course, causes the pilot valve 36 to shift, actuating the pilot piston 46.

The pilot piston 46 is mechanically linked to the drive cylinder valve 48 which operates the respective actual bucket on the real backhoe arm. Assuming the valve 48 is moved to the right, fluid will commence to flow into the drive cylinder 50, which actually powers the real bucket, and move the piston 52 to the left. This, in turn, moves the mechanical feedback linkage 54 to the left, driving the feedback piston 56 in the feedback cylinder 58 to the left, which has the effect of filling pilot inlet 40 and draining pilot inlet 34, which cancels the action of piston 32.

The feedback mechanism 54, 56 and 58 is mechanically implemented by a spring loaded cable connected to the distal end of the rod of piston 52 in an arrangement detailed below. An analysis of the hydraulics of the system reveals that displacement of the control cylinder 32, by rotating the bucket 12, will cause valve 48 to open until this displacement is equaled by piston 56 in the feedback cylinder, which neutralizes the effect of control cylinder 22. In normal operation there is also a restraint on the control piston 32 caused by the hydraulic back pressure which will occur as the inlet 34 fills, and will not be relieved until the feedback cylinder 58 supplies enough feedback fluid. Therefore, there is a virtual simultaneous analagous motion between the replica arm and the real arm. Unless too much force is applied to the piston 32, it will not anticipate the action of the drive cylinder 50 by more than a few milliseconds. For all intents and purposes, the operator, operating on the replica, is simultaneously operating on the real world through the actual backhoe arm.

Reverse action of the bucket 12, of course, has exactly the opposite action through the hydraulic system. This bi-directional analog is duplicated at each of the articulations 24 through 30 and acts through a bank of four side-by-side pilot valves 36 which are mechanically linked directly to the usual operating knobs of the conventional hydraulic controls, not shown. From this bank of valves, hydraulic lines extend both the the base 22 of the replica, and, in the other direction, out to the feedback cylinders 58 which are mounted on the drive cylinders 50.

Turning now to the mechanical description, with a few exceptions the details of construction of the dipper stick do not form part of the novelty of the invention. The exact combination of plates, panels, pivot pins, annular hydraulic fluid ducts and other hydraulic fluid passages, are for the most part standard engineering design. For this reason the arm of the backhoe will be described in somewhat summary fashion.

The base 20 defines a plurality of passageways 60 in a kind of manifold which communicate from the arm to the pilot valves. These passageways are defined in a block structure which includes (as the same or separate piece) a portion having a bore 64 through it with a plurality of annular fluid passageways 66 separated by O-rings 68.

A drum 70 fits snugly within the bore 64 and defines a plurality of generally radial bores 72, each of which communicates with one of the passageways 66, and extends internally of the drum and downwardly into the block portion 74 which, by virtue of the angular sliding ability of the drum 70 in the bore 64, is freely articulated about a vertical axis.

Each articulation, including the articulation 30 between the base member and the lower rotating block 74, operates a control piston and cylinder combination such as the diagrammatically illustrated piston 32 and cylinder 22. For the articulation 30, a spur 76 extends above the drum 70 and rotates therewith, operating a rack on a piston rod 78 which connects to piston 80 sliding in cylinder 82. The piston has a rear piston rod 84 so that displacement on both sides of the piston is equal. The piston preferably has relief checkvalves such as valves 86 shown in FIG. 22 to prevent damage to the structure should a jam occur. Once fluid passes through the checkvalves, the control and actual cylinders will be out of synchronization. To re-synchronize the pair, the actual bucket can be brought against an immovable object, and the control cylinder pushed beyond the ability of the actual cylinder's ability to respond until synchronization is achieved.

The pinion, rack, and piston-cylinder arrangement for all four articulations are similar to that just described for articulation 30, and will not be redescribed for each articulation, but will be referred to in each instance as a "control cylinder system", which will be understood to include the above components, plus seals, plates, and other items that are apparent from the drawings and necessary for the proper operation of the machine.

In the block 74 another relief cylinder system 88 is provided for articulation 28. This cylinder communicates through passageways 90 to the drum 70. This is the boom control system, and operation of the boom causes the pinion to operate the rack and move the piston.

Figures 25, 26, 27, 28:
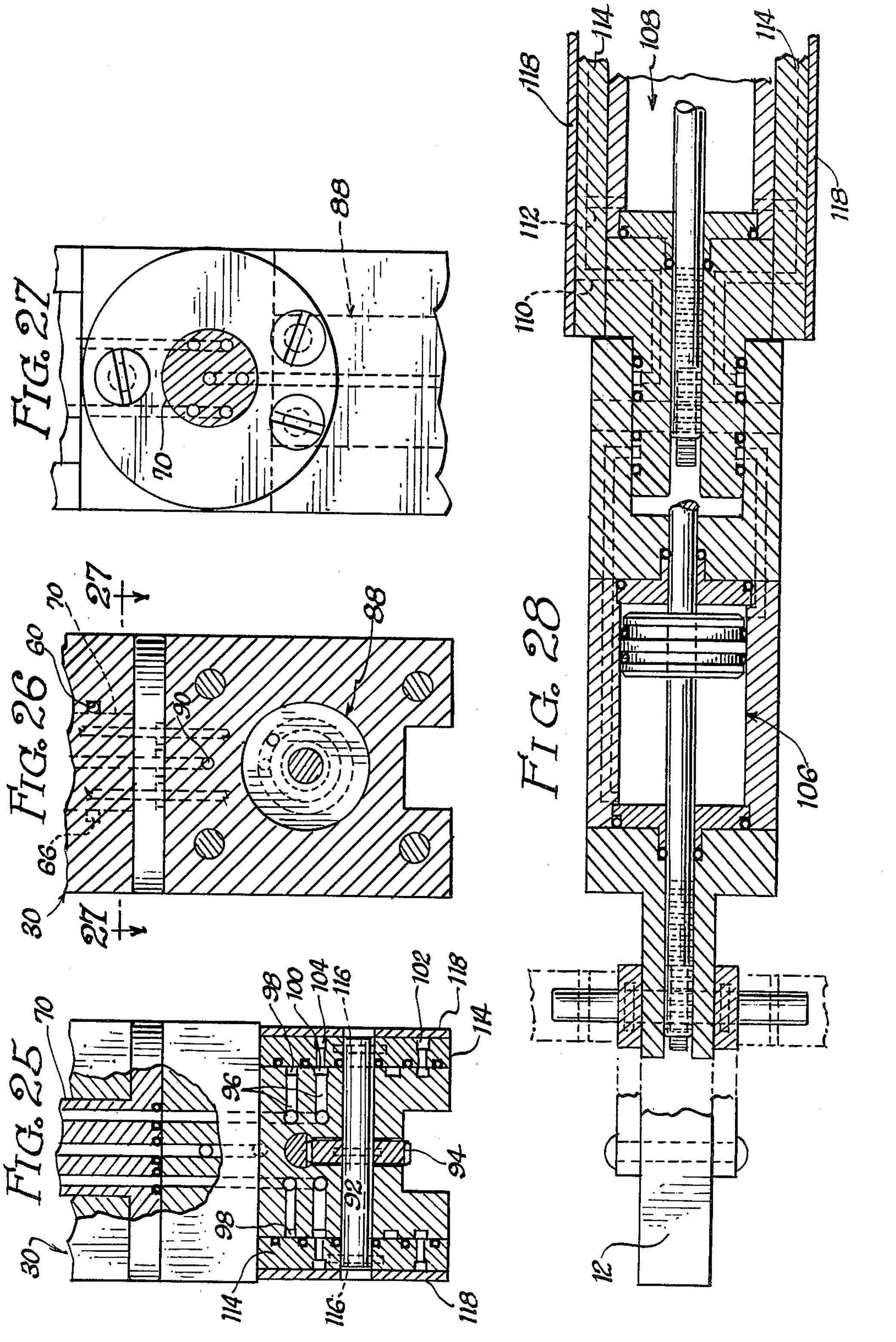
FIG. 27 is a section taken along line 27—27 of FIG. 26.
FIG. 28 is a section through the portion of the backhoe arm including the two outermost articulations.

FIG. 25 illustrates the pinion shaft 92 on which the pinion 94 is pinned. Passageways 96 (shown in FIG. 25) communicate with two pairs of annular passageways 98 and 100 which interface with transmittal port pairs 102 and 104 which communicate respectively with the bucket control cylinder system 106 and the dipper stick control system 108.

Figures 20, 21, 22, 23, 24:
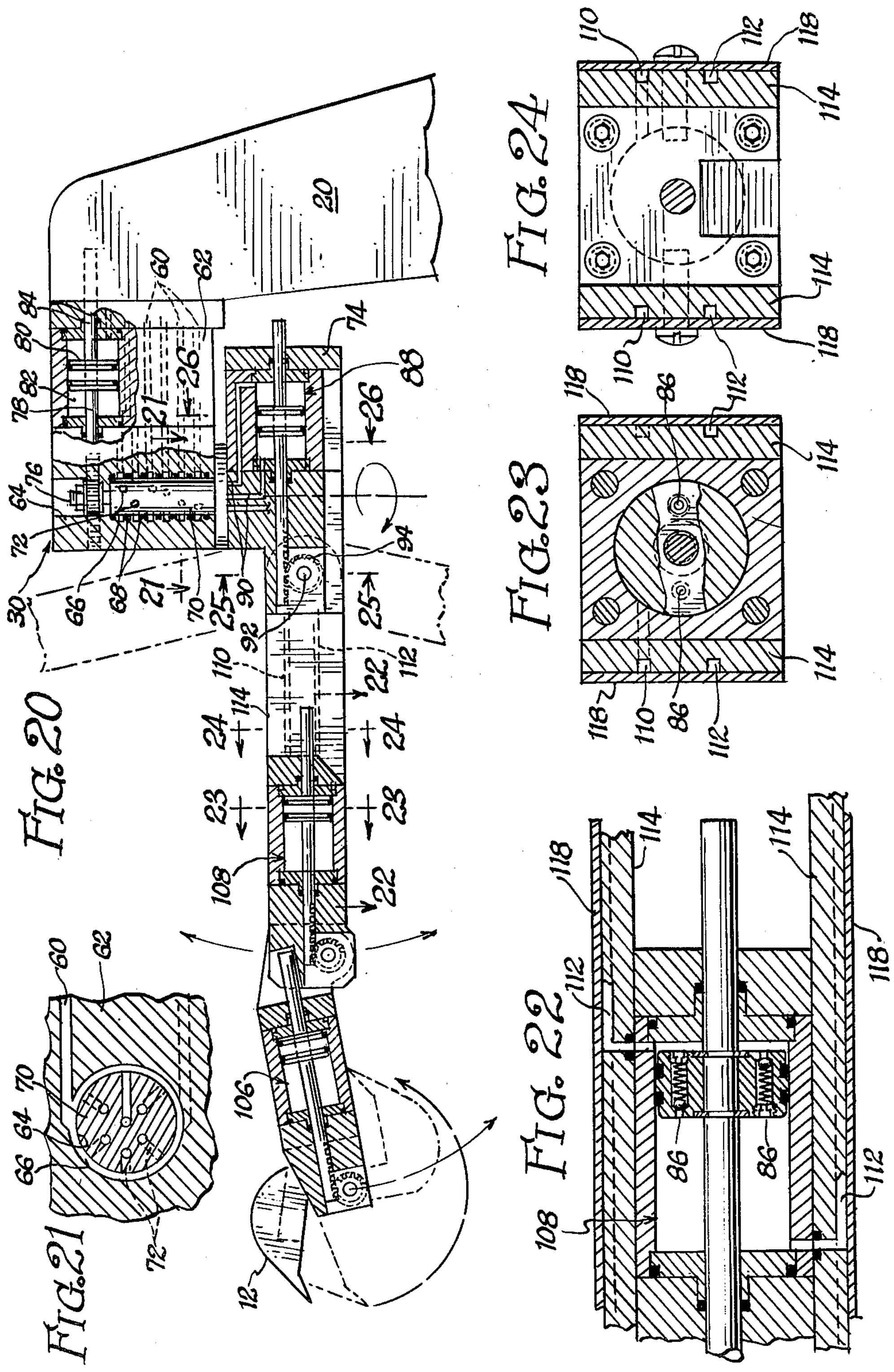
FIG. 20 is a section taken through the backhoe arm structure to illustrate the operative control mechanism therein.
FIGS. 21 through 26 are sections taken along the respective section lines indicated in FIG. 20.

The port pairs 102 and 104 communicate with passageway pairs 110 and 112, seen in phantom in FIG. 20, which respectively service the bucket control cylinder and dipper stick control cylinder. These passageways are defined in boom side plates 114, through which pins 116 pass to engage pinion shafts 92 shown in FIG. 25. Cover plates 118 cover the boom side plates 114 to create a discrete set of channels defined within the side plates 114.

Without going into more detail, it can be seen that at each articulation a pinion drives a piston within the appropriate control system as the articulation moves, and control fluid from these cylinders is delivered through the drum 70 and manifold blocks 62 to be distributed to the appropriate pilot valve.

Attention is now directed to the pilot valve, illustrated in the Figure sequence from FIG. 5 through FIG. 15. Generally speaking, all the body parts of the valve are rectangular with the exception of the piston and cylinder. The valve has a base plate 120, a cylinder wall 122, a cylinder cap 124 and an end wall 126, all being held together by the bolts 128. The cylinder wall defines cylinder 130 in which rides the piston 132, which is prevented from axial motion by two parallel piston rods 134 which pass through suitable sealed apertures in the cylinder cap 124 to terminate in a tie bracket 136. A pair of through bolt holes 138 pass through the cylinder block and join four blocks together.

Drainage is provided to the cylinder through restricted orifice nuts 140 linked with passageway 142, with consecutive cylinder blocks being linked by pass-through bore 144.

Turning to the piston assembly, the piston 132 has end seals 146 and a relieved annular area between the seals defining a chamber 148. This chamber is continuous around the piston and communicates with a bore 150 in the cylinder block, indicated in phantom in FIG. 8. This bore ordinarily would be the hydraulic fluid supply line, and again would pass through all cylinder blocks. A radial bore 152 in the piston communicates between the chamber 148 and an axial bore through the piston which seats spindle 154. The spindle is mounted on bearings 156 at either end and locked in place with nut 158.

Figure 11:
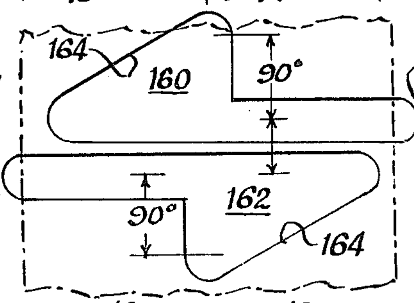
FIG. 11 is a projection of the perimeters of the relieved sections of the piston of FIG. 10 as projected into a planar configuration.
Figure 12:
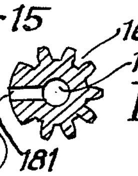
FIGS. 12 through 15 are sections taken along the indicated section line of FIG. 10.

The spindle has two relieved portions 160 and 162 shaped somewhat like elongated lamb chops and illustrated as they would appear if the perimeters were rolled into a flat plane in FIG. 11. Due to these relieved portions, which communicate between opposite ends of the cylinder 130 and the central portion of the piston bore, rotation of the spindle in one direction or the other will cause the nearest portion of the inclined surface 164 of the respective bore to index with the piston bore 152, permitting the fluid, which is under pressure in the cylinder, to escape from the respective end of the cylinder through the bore 152, and the bores 150 in the blocks, to a hydraulic reservoir. Clearly, rotation of the spindle in opposite directions causes the piston to move in opposite directions. The tapered edges 164 of the relieved portions causes the piston to smoothly slow down, coming to a stop as the orifice 152 passes across the edge 164, out of the relieved zone.

It can thus be seen that power control of the piston 132 can be effected by rotating the spindle 154 in a controlled manner. This is accomplished with a rack 166, cut in a cylindrical rack bar 168 having O-ring seals 170 and end plugs 172 which are too small to seal the opening. The O-rings 170 provide the seal.

Figure 5:
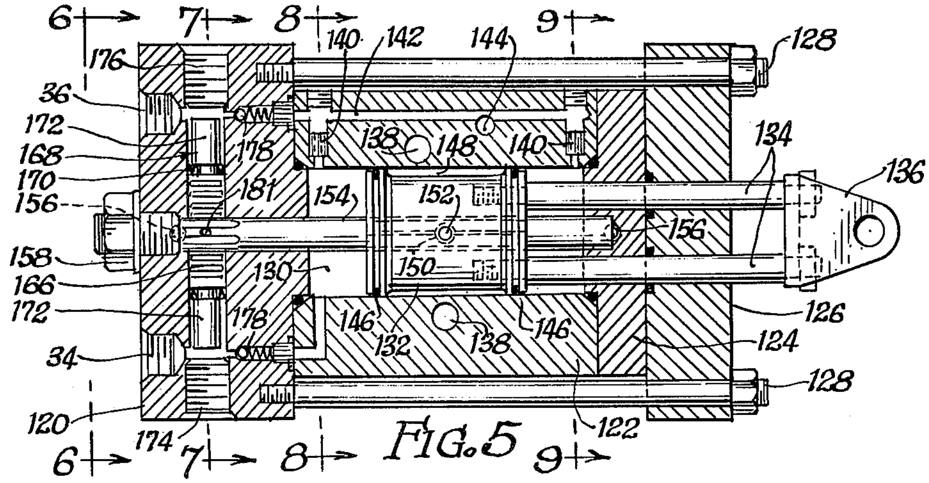
FIG. 5 is a section through the pilot valve-pilot piston.
Figure 6:
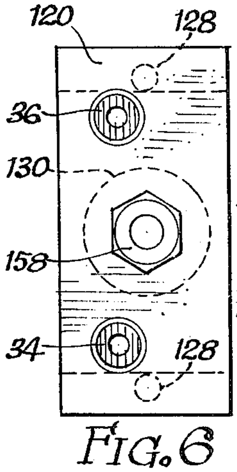
FIG. 6 is an elevation view from line 6—6 of FIG. 5.
Figure 7:
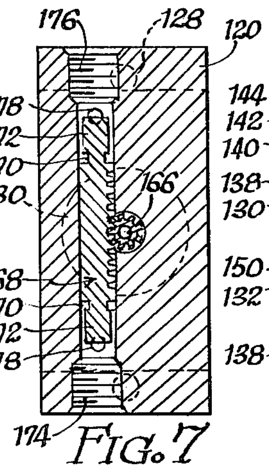
FIGS. 7 through 9 are sections taken along the lines numerically indicated in FIG. 5.
Figure 8:
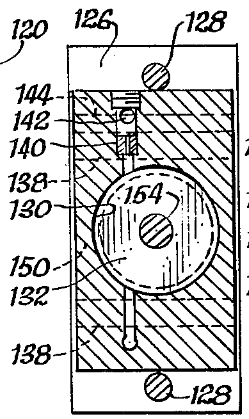
Figure 9:
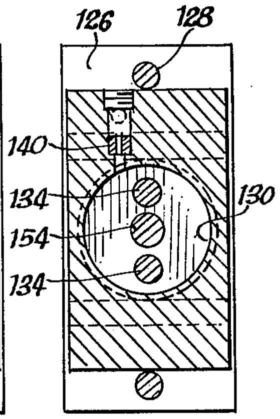

The inlet ports 34 and 36 shown in conjunction with the pilot portion of the system in the description of FIG. 4 can also be seen in the physical embodiment of the valve in FIG. 5. Feedback ports are bored directly into the base plate 120 and indicated at 174 and 176. All ports communicate through relief ball checkvalves 178 into the cylinder which drains through orifice 140, to permit thermal expansion. It should thus be clear from the above description that pilot pressures and feedback pressures delivered to the valve at the respective inlet ports will cause the rack bar 168 to translate, thus rotating the spindle and causing the piston to move one direction or the other. As will be recalled from the discussion of the entire hydraulic circuit and the feedback system, the piston, through its coupling plate 136, drives the valve of the actual equipment hydraulic cylinder which, through a mechanical and hydraulic coupling, immediately feeds back through the appropriate port 174 or 176, cancelling the initial pilot action, unless the initial action is continued by the continual operation of the control cylinder 132. In the latter event, the pilot piston 132 will remain in a fixed, displaced position as long as the control cylinder moves at a fixed velocity. In other words, the static, offset position of the piston 132 corresponds to the steady, proportional movement of the control piston and drive piston in their respective cylinders.

Figure 10:
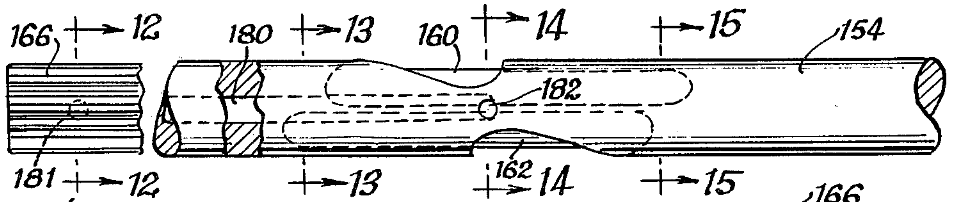
FIG. 10 is a side elevation, partially cut away and partially in phantom, of a fragment of the spindle which operates the pilot piston.
Figure 13:
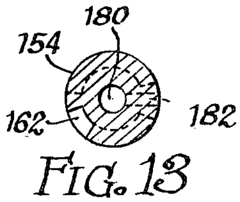
Figure 14:
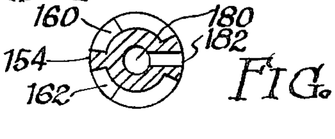
Figure 15:
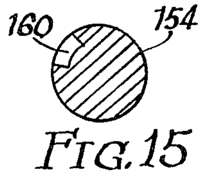

Another feature of the pilot valve-piston system can be seen in FIGS. 10, 13 and 14. A passageway 180 defined axially inside the spindle communicates with the cylinder through opening 181 and an outlet 192, which indexes with port 152 when the system is in its neutral through position. This passageway supplies fluid to the control system in the event of contraction due to termperature.

Figures 16, 17, 18, 19:
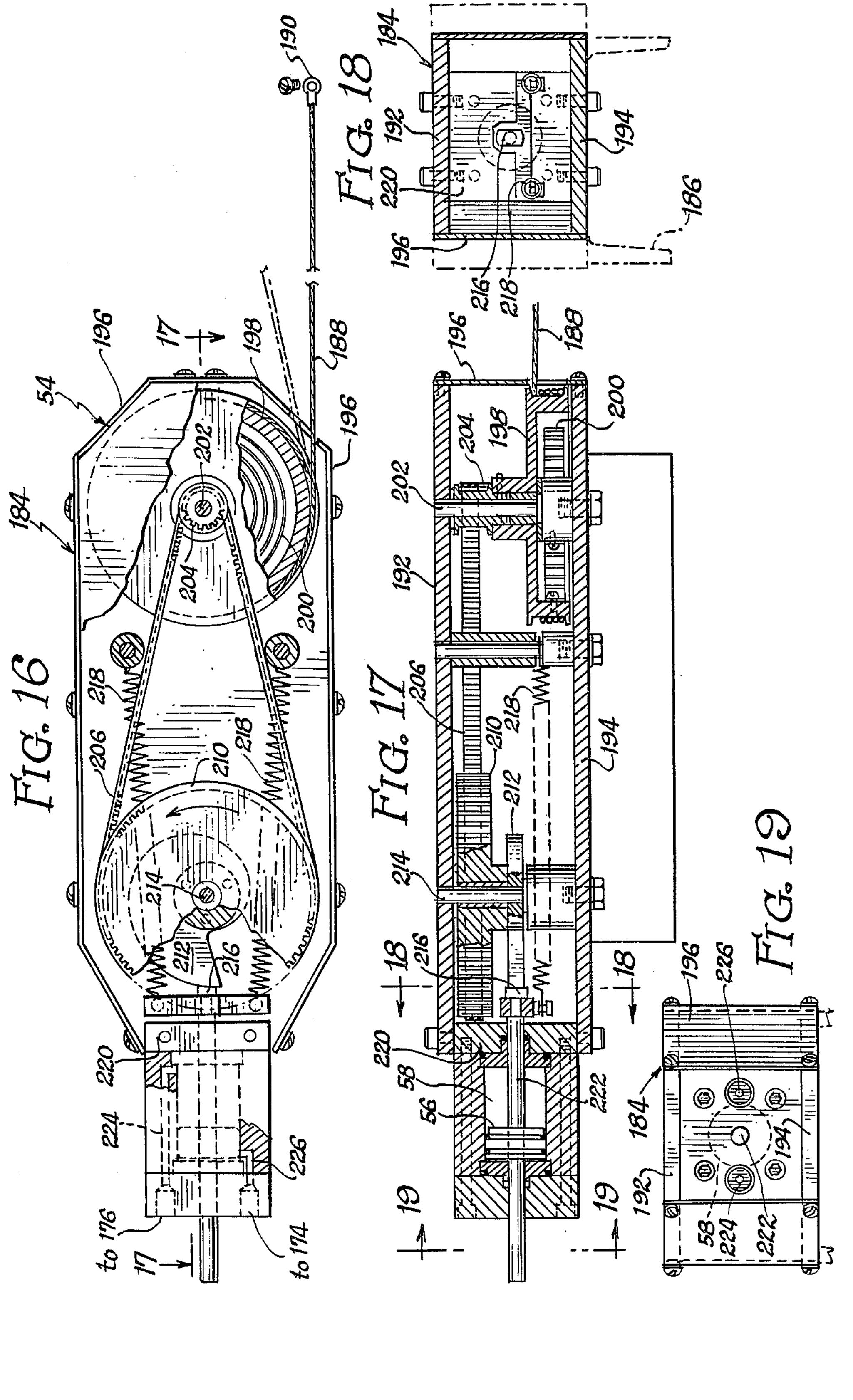
FIG. 16 is a partially cut away, partially phantom illustration of the hydraulic feedback mechanism.
FIG. 17 is a section taken along line 17—17 of FIG. 16.
FIGS. 18 and 19 are sections taken through the indicated lines of FIG. 17.

The feedback structure is shown in FIG. 16. This subsystem, which ordinarily would be on the order of six to eight inches long, would mount directly on the cylinder housing, or near the cylinder housing, out on the arm of the actual equipment. The mechanism has a housing 184 with mounting brackets 86 of the equivalent to permit mounting of the unit as a retrofit item. A cable 188 has a terminal 190 which is bolted into the other side of the equipment articulation, ordinarily the distal end of the piston rod or adjacent structure. The extension of the cable 188 is thus exactly the same as the extension of the drive piston.

The housing, which includes a pair of side plates 192 and 194 and a peripheral wall 196, also mounts a spool or reel 198 for the cable. Cable tension is maintained by a leaf spring 200 inside the reel.

Mounted coaxially on the axle 202 is a sprocket 204 for driving a chain or toothed belt 206 which passes around a larger pulley or sprocket 210 at the other end of the housing. The ratio between the two sprockets is such that several revolutions of the small sprocket will cause only a partial rotation of the large sprocket.

A cam 212 is driven by the large sprocket, and is mounted coaxially therewith on a post 214. A cam follower 216 is held firmly against the cam surface by extension springs 218.

The feedback cylinder 58 occurs on the other side of an end wall 220 and is driven by a piston rod 222 connected to the cam follower 216. As can be seen in FIG. 16, hydraulic fluid passageways 224 and 226 terminate in ports into which return lines connect, communicating with the feedback ports 174 and 176 of the pilot apparatus.

Although there are clearly more direct ways of converting the extension of the drive cylinder into the operation of a feedback hydraulic cylinder, several advantages are inherent in the use of the cam assembly illustrated. First, because tension on the cable drives the cam into its lower profile positions, there can be no forceing action on the feedback piston in case of jambing. Since a cable cannot be pushed, force from the equipment cannot cause damage to the feedback unit in case anything is jammed. Undue pressure backing up into the passageway 226 would not occur because this passageway communicates with the threshold relief valve 178.

Another, and more important advantage of the cam lies in the fact that the rack and pinion control movement at the articulations of the replica do not physically duplicate the geometry of movement of most hydraulic cylinders. The presence of the cam provides an ideal means of proportionating what would otherwise be a non-linearity in the operation of the drive cylinders by the control cylinders. Another control feature lies in the spring-loaded nature of the drive cylinders 48 which will bring them back to the neutral position absent a control force. This causes a bias toward the stopped mode for the entire system.

While I have described the preferred embodiment of the invention, other embodiments may be devised and different uses may be achieved without departing from the spirit and scope of the appended claims.

What is claimed is:

1. A servo amplification system comprising:
(a) a control cylinder having a double-acting control piston defining a first and second control chamber on opposite sides of said piston;
(b) a pilot valve and a pilot cylinder having a doubleacting piston and being operated by said pilot valve, said valve having a first and second inlet port connected to said first and second control chamber, respectively, to drive said pilot selectably in a first or second direction;
(c) a drive cylinder having a drive piston activated by a directional valve operated by said pilot cylinder;
(d) a feedback cylinder with a double-acting feedback piston operatively connected to said drive piston to be moved thereby, said feedback cylinder defining first and second feedback chambers on opposite sides of said feedback piston, said first and second feedback chambers communicating with said second and first inlet ports respectively, such that movement of said control piston in a first direction operates, through said pilot valve and cylinder, said drive cylinder which moves a distance proportional to the distance moved by said control cylinder.

2. Structure according to claim 1 wherein said feedback piston is mounted on a rod operated by a cam which is rotated by said drive piston as same extends and retracts and said cam is shaped to proportionate the distance moved by said drive cylinder relative to the distance moved by said control cylinder.

3. Structure according to claim 2 wherein said cam is driven by a coaxial pulley driven by a belt driven by a spool having a cable wound thereon and connected to said drive piston.

4. Structure according to claim 2 wherein said feedback cylinder and piston are mounted in a housing having means to mount same on a drive cylinder.

5. Structure according to claim 4 wherein said housing includes a cable-wound cylinder driving a cam and said feedback piston is mounted to a cam follower, and including means to fix the free end of said cable to the rod of said drive piston whereby said servo amplification system is mountable as a retrofit on existing equipment.

6. Structure according to claim 1 wherein said servo amplification system includes a plurality of sub-servo amplification systems each including a control cylinder and piston, a pilot valve, cylinder, and piston, a drive cylinder and piston, and a feedback cylinder and piston, and each sub-system controls a different dimension of movement.

7. Structure according to claim 6 wherein said system is mounted on a unit of construction equipment having an actual operative element having a plurality of dimensions of motion powered by respective ones of said sub-systems, and including a miniature replica operative element having a plurality of dimensions of motion corresponding to those of the actual operative element and having the control cylinders and pistons of said subsystems operatively connected to said miniature operative element responsive to the respective dimensions of motion thereof.

8. Structure according to claim 7 wherein said unit is a backhoe and said actual operative element is a backhoe bucket articulated on a dipper stick articulated on a boom articulated for rotational motion about a vertical axis on a base member.

9. Structure according to claim 8 wherein said replica includes one of said sub-system control cylinders and pistons operatively mounted for each articulation and operated by the motion of the respective articulation to operate proportionately the articulations of said actual backhoe bucket.

10. Structure according to claim 9 wherein the pistons of said control cylinders are each provided with bi-directional pressure relief valves.

11. Structure according to claim 9 wherein said replica includes a plurality of hydraulic lines passing fluid from said control cylinders through to said base, and said hydraulic lines are defined by the replica dipper stick and boom.

12. Structure according to claim 9 wherein said control pistons are each mounted on a piston rod defining a rack at one end, said control cylinders are mounted at one side of said articulation and including a pinion fixed to the other side of the respective articulation coaxially with the respective axis of articulation.

13. Structure according to claim 12 wherein each of the feedback pistons is driven by a cam shaped to linearly proportionate the motions of the actual and replica operative elements.

* * * * *